(12) United States Patent
Jorgensen et al.

(10) Patent No.: US 6,237,737 B1
(45) Date of Patent: May 29, 2001

(54) POWER ACTUATOR HAVING AN ELECTROMAGNETIC CLUTCH ASSEMBLY

(75) Inventors: Gregory A. Jorgensen, Oxford, MI (US); Douglas G. Overbury, Holland Landing (CA); Carl Gifford, Barrie (CA); Roman Cetnar, Newmarket (CA); Peter L. Oxley, Mount Albert (CA); Kathryn Petroff, East York (CA)

(73) Assignee: Atoma International Corp., Ontario (CA)

( * ) Notice: Subject to any disclaimer, the term of this patent is extended or adjusted under 35 U.S.C. 154(b) by 0 days.

(21) Appl. No.: 09/453,690

(22) Filed: Dec. 3, 1999

Related U.S. Application Data

(60) Provisional application No. 60/110,728, filed on Dec. 3, 1998.

(51) Int. Cl.$^7$ .............................. F16D 27/118; F16D 27/14
(52) U.S. Cl. .................................. 192/84.92; 192/84.961
(58) Field of Search .............................. 192/84.92, 84.96, 192/84.961; 292/201, 336.3; 49/139, 140, 280, 360; 296/155

(56) References Cited

U.S. PATENT DOCUMENTS

| | | | |
|---|---|---|---|
| 1,989,984 | 2/1935 | Hope | 192/84 |
| 2,389,461 | 11/1945 | Satterlee | 74/421 |
| 2,875,876 | 3/1959 | Rudisch | 192/84 |
| 2,919,775 | 1/1960 | Wiedmann et al. | 192/84 |
| 3,672,042 * | 6/1972 | Jaeschke | 29/602.1 |
| 3,825,781 | 7/1974 | Woods | 310/90 |
| 4,010,832 * | 3/1977 | Puro | 192/84.92 |
| 4,121,382 | 10/1978 | Dietrich et al. | 49/334 |
| 4,184,577 | 1/1980 | Miller | 192/84 |
| 4,210,890 * | 7/1980 | Olsen | 335/281 |
| 4,223,927 | 9/1980 | Kobayashi et al. | 292/1 |
| 4,285,421 * | 8/1981 | Halsted | 192/84.96 |
| 4,530,185 | 7/1985 | Moriya et al. | 49/280 |
| 4,566,576 | 1/1986 | Moriya et al. | 192/84 |
| 4,640,050 * | 2/1987 | Yamagishi et al. | 49/280 |
| 4,744,449 | 5/1988 | Sekella et al. | 192/84 |
| 4,885,954 | 12/1989 | Wanlass | 74/625 |
| 5,076,016 | 12/1991 | Adams et al. | 49/360 |
| 5,088,347 | 2/1992 | Wanlass | 74/625 |

\* cited by examiner

Primary Examiner—Rodney H. Bonck
(74) Attorney, Agent, or Firm—Patton Boggs LLP

(57) ABSTRACT

The present application discloses a power actuator that has a motor having a rotatable motor output member and a clutch assembly. A stamped, cup-shape ferromagnetic coil casing has a generally radially extending base wall and an annular side wall extending generally axially from the base wall. An annular ferromagnetic flux intensifying washer is positioned adjacent to the base wall of the coil casing. An annular coil of electroconductive material is disposed within the casing with the side wall extending in surrounding relation with respect to the coil such that the field generated by the coil flows generally radially through the base wall and generally axially through said side wall. A ferromagnetic armature is in sliding relation with the annular coil and movable between an engaged position and a disengaged position.

12 Claims, 2 Drawing Sheets

POWER ACTUATOR HAVING AN ELECTROMAGNETIC CLUTCH ASSEMBLY

The present application claims priority to U.S. Provisional Application of Jorgensen et al., Serial No. 60/110,728, filed Dec. 3, 1998, the entirety of which is hereby incorporated into the present application by reference.

FIELD OF INVENTION

The present invention relates to a power actuator having an electromagnetically actuated clutch assembly and more particularly to a power actuator having an electromagnetically actuated clutch assembly for use with a latch assembly for a vehicle closure panel.

BACKGROUND OF THE INVENTION

Conventional vehicle closure panels, such as mini-van sliding doors and lift gates, carry a latch assembly that includes a latch member that cooperates with a striker on the vehicle body to retain the panel in a closed position. A manually operated lever or the like is provided to enable a user to release the latch member, thereby enabling the panel to be moved into an open position.

In addition, it is known in the art to provide such latch assemblies with a power operation feature to ensure that the panel is securely and tightly closed. More specifically, these latch assemblies have a power actuator that functions to cinch the panel from an initially closed position to a fully closed position. Typically, the way that these power operated latch assemblies work is that the panel is moved in a closing manner, either manually or under power, towards and into an initially closed position whereat the latch member cooperates with the striker to retain the panel in that position. Then, power is supplied to the power actuator, which responsively moves the latch member in a cinching action to move the panel into its fully closed position. During this cinching action, a motor within the actuator drives the latch member so that it cooperates with the striker to fully close the panel.

To unlatch and open the panel, the user simply actuates the lever to release the latch member, as in conventional latch assemblies. The problem with the powered latch assembly arrangement is that such movement of the latch member back-drives the actuator motor, thereby creating resistance and making such movement somewhat difficult. To remedy this problem, a clutch assembly may be used to uncouple the latch member and the actuator motor, thus obviating the back driving problem. One type of clutch assembly that it would be desirable to use in this context is an electromagnetic clutch assembly. The use of an electromagnetic clutch assembly is desirable as a result of its low cost and reliable performance. From a commercial standpoint, the design of such an electromagnetic clutch assembly must be compact enough for use in the motor vehicle. Further, the material and manufacturing costs of the electromagnetic clutch assembly must be kept relatively low in order to keep the overall costs of the latch assembly at a competitive economic level.

The use of a stamped coil casing for an electromagnetic clutch is preferred because stamping allows the casing to be manufactured relatively inexpensively at a high production rate. However, the use of a stamped coil casing creates a problem with the flux of the magnetic field. Specifically, the overall cross-sectional area of the base wall decreases towards the center thereof. As a result, the base wall provides significantly less cross-sectional area for the flux to flow through at the center thereof than at the radial outer edge thereof. This creates an area of low permeability towards the center of the base wall, which in turn restricts the overall intensity of the magnetic field. Stated differently, the base wall creates a "bottleneck" towards the center thereof. One way to eliminate this bottleneck and increase the field intensity would be to increase the thickness of the base wall, thereby increasing its effective cross-sectional area. However, this results in the overall thickness of the casing being increased. This is undesirable because it increases the overall weight and manufacturing costs associated with the casing.

Alternatively, the casing could be manufactured only with the base wall thereof being provided with an increased thickness. However, this alternative construction cannot be stamped and thus any cost-savings realized by stamping would be lost.

SUMMARY OF THE INVENTION

It is therefore an object of the present invention to provide a low cost power actuator for use in a power latch assembly of a vehicle closure panel.

To achieve this object, the present invention provides a power actuator for a latch assembly having a latch member movable between (a) a released position wherein the latch member is disengaged from a striker to permit a closure panel of the vehicle to move between open and closed positions, (b) an initially latched position wherein the latch member cooperates with the striker to maintain the closure panel in a partially closed position, and (c) a fully latched position wherein the latch member cooperates with the striker to maintain the closure panel in a fully closed position.

The power actuator has a motor having a rotatable motor output member and a clutch assembly. The clutch assembly has a rotatable clutch output member. A stamped, cup-shaped ferromagnetic coil casing has a generally radially extending base wall and an annular side wall extending generally axially from the base wall. An annular ferromagnetic flux intensifying washer is positioned adjacent to the base wall of the coil casing. An annular coil of electroconductive material is operable to selectively generate a magnetic field. The coil is disposed within the casing with the side wall extending in surrounding relation with respect to the coil such that the field generated by the coil flows generally radially through the base wall and generally axially through said side wall. A ferromagnetic armature is in sliding relation with the annular coil and movable between (a) an engaged position wherein the armature couples the motor output member and the clutch output member together so that energization of the motor rotatably drives the clutch output member and (b) a disengaged position wherein the motor output member and the clutch output member are uncoupled to enable the clutch output member to rotate without resistance from the motor. Selective energizing of the coil effects movement of the armature between the engaged and disengaged positions thereof.

The present invention provides an annular ferromagnetic flux intensifying washer positioned adjacent to the base wall of the coil casing to minimize the "bottleneck" problem. The washer increases an amount of ferromagnetic material in the portion of the magnetic field where the base wall is located so as to increase a magnetic permeability of the portion of the magnetic field without increasing the thickness of the base wall. As a result, the casing can be manufactured by a low cost stamping operation without sacrificing the strength or intensity of the magnetic field.

DETAILED DESCRIPTION OF THE PREFERRED EMBODIMENT OF THE INVENTION

Figure 1:
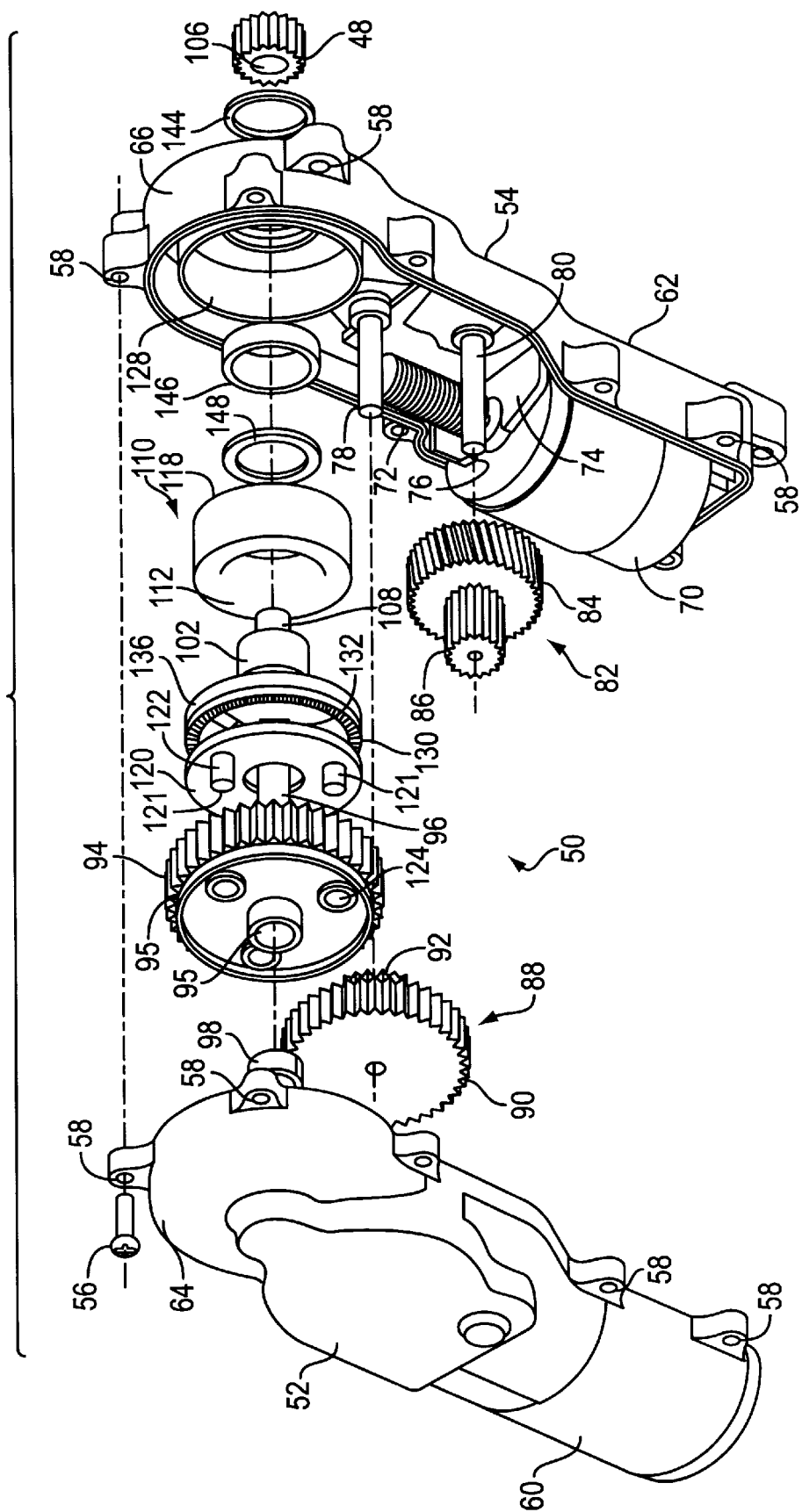
FIG. 1 is an exploded view of a power actuator constructed in accordance with the principles of the present invention.
Figure 2:
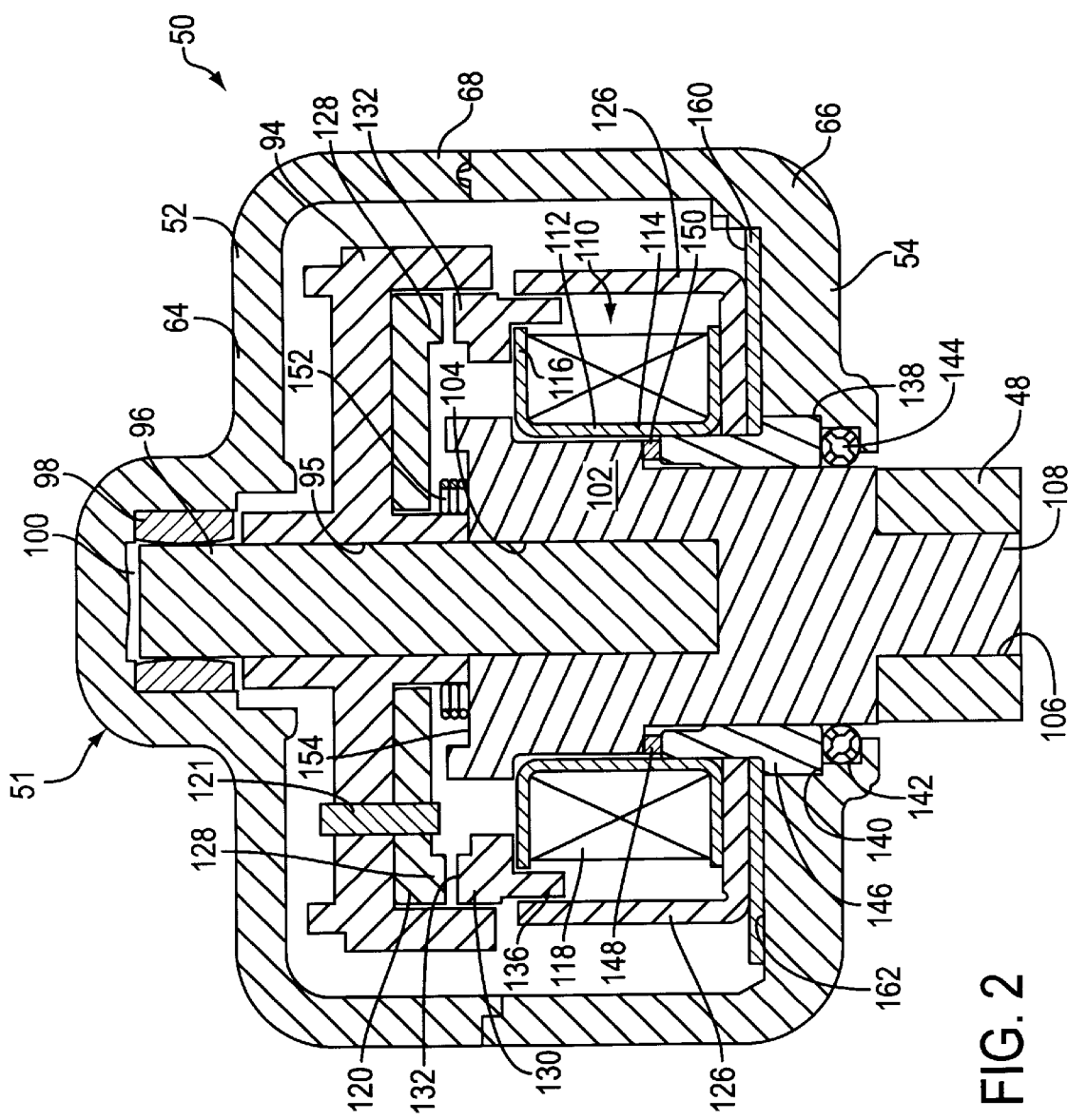
FIG. 2 is a cross-sectional view of the power actuator of FIG. 1 taken along the rotational axis of the electromagnetic clutch assembly.

FIG. 1 illustrates a clutch assembly, generally indicated at 50, in exploded view and FIG. 2 shows a cross sectional view taken along the rotational axis of the clutch assembly 50. The clutch assembly 50 is mounted within a housing, generally indicated at 51, comprising two complementary housing halves 52, 54 that are secured together by a plurality of fasteners 56 inserted through fastener receiving openings 58. Each housing half 52, 54 is molded from plastic and has a motor housing half-portion 60, 62 and a clutch assembly housing half-portion 64, 66 that cooperate to define a motor housing portion (not shown) and a clutch assembly housing portion 68, respectively.

The motor housing portion houses a conventional electrically powered D.C. motor 70 mounted therein. The motor 70 has a rotatable output member in the form of a worm gear 72. A motor guiding portion 74 formed integrally with the housing half 66 has a slot 76 formed therein. The motor 70 is mounted below the guiding portion 74 with the worm gear 72 extending through the slot 76. The slot 76 properly guides and aligns the worm gear 72 into its proper position during assembly and maintains the worm gear 72 in position during operation.

The housing half 66 has first and second fixed gear mounting shafts 78, 80 mounted thereto in spaced apart relation. The gear mounting shafts 78, 80 extend generally perpendicularly to the axis of the worm gear 72. A first combination gear 82 comprising a helical gear portion 84 and a pinion gear portion 86 formed integrally together is rotatably mounted on the second gear mounting shaft 80. The helical gear portion 84 has a greater diameter than the pinion gear portion 86. The helical gear portion 84 is engaged with the worm gear 72 in an intermeshed relationship such that motor driven rotation of the worm gear 72 causes rotation of the first combination gear 82.

A second combination gear 88 is rotatably mounted to the first gear mounting shaft 78. The second combination gear 88 comprises a large pinion gear portion 90 and a small pinion gear portion 92 formed integrally together. The large pinion gear portion 90 is engaged with the pinion gear portion 86 of the first combination gear 82 such that rotation of the first combination gear 82 (as a result of the worm gear 72 being rotated by the motor 70) rotates the second combination gear 88. It should be noted that the combination gears 82, 88 and the worm gear 72 are always engaged together in intermeshing relationships so that the motor 70 rotatably drives all three. Thus, these three gears could be broadly considered to function together as the motor output.

The clutch assembly 50 comprises an input pinion gear 94 rotatably mounted to an intermediate portion of a shaft 96 such that the gear 98 can rotate relative to the shaft 96. The input gear 98 has an opening 95 formed therethrough through which the shaft 96 is rotatably received. A journal bearing 98 (FIG. 2) fits into an opening 100 in the actuator housing half portion 66. One end of the shaft 96 is rotatably mounted inside the journal bearing 98. The other end of the shaft 96 is fixedly coupled to a rotor 102 by inserting the shaft 96 into a bore 104 formed in one end of the rotor 102. The fixed relation between the shaft 96 and rotor 102 may be achieved by threaded engagement, adhesive bonding, or any other suitable means.

The teeth 97 on the input gear 94 are engaged with the small pinion gear portion 92 of the second combination gear 88 in an intermeshed relationship such that rotation of the second combination gear 88 rotatably drives input gear 94. Thus, the input gear 94 serves to input the rotational driving of the motor into the clutch assembly 50.

The clutch output pinion gear 48 is fixedly mounted on the end of the rotor 102 opposite the shaft 96. The pinion gear 48 has a bore 106 formed therethrough in which a narrowed portion 108 of the rotor 102 is received in fixed relation. The fixed relation may be achieved by threaded engagement, adhesive bonding, or any other suitable attachment means. Because the input gear 94 is rotatably mounted to the shaft 96, rotation of the input gear 94 will normally not cause rotation of the shaft 96, the rotor 102, or the pinion gear 48.

The clutch assembly 50 also comprises a magnetic field inducing coil 110 received within the interior of a coil casing 126. As is conventional with such coils, the coil 110 includes an annular coil receiving portion 112 with an annular base portion 114 and a pair of annular flanges 116 extending outwardly from the base portion 114. A length of thin extruded copper wire is coated with insulation and wrapped around the coil receiving portion 114. The wire coiling is shown schematically at 118 in FIG. 2. When an electric input signal in the form of an electric current is applied to the copper wire, a magnetic field is created or induced around the coil 110. The role of the magnetic field will be appreciated from the discussion set forth below.

The clutch assembly 50 further comprises an armature 120. The armature 120 has a plurality of pin receiving openings 122 and the input gear 94 has a plurality of pin receiving openings 124. The armature 120 is secured to the input gear 94 for rotational movement together about the shaft 96 by inserting a plurality of pins 121 into the pin receiving openings 122, 124. These pins 121 allow the armature 120 to move axially relative to the gear 94 between its engaged and disengaged positions, while continuing to rotate together with the gear 94. The armature 120 is made of a material such as iron or other ferromagnetic materials that will be magnetically attracted towards the coil 110 as a result of the magnetic field induced by the coil 110. An axial surface of the armature 120 facing away from the pinion gear has a set of engaging teeth 128 spaced circumferentially about the outer radial edge thereof.

The rotor 102 has an engaging portion 130 with a set of engaging teeth 132 formed on one axial face thereof. The teeth 132 are spaced circumferentially about the radial edge of the engaging portion 130 and face the teeth 128 of the armature 120. The role of the teeth 128, 132 will become apparent further in the application. The engaging portion 130 also has a downwardly depending portion 136 extending axially into the coil casing 126.

The actuator housing half 66 has a bore 138 formed therethrough. The interior surface defining the bore 138 has a pair of annular stepped shoulder surfaces 140, 142. An annular rubber sealing member 144 is mounted to the shoulder surface 142. The sealing member 144 prevents moisture from entering the actuator housing 68 and corroding the ferromagnetic components of the clutch assembly 50. A bearing 146 is mounted in a force fit relation within the bore 138 and engages the shoulder surface 140. Although the bearing 146 may be plastic, it is preferred that the bearing be made of a ferromagnetic material in order to increase or intensify the flux of the magnetic field produced by the coil 110. The advantages associated with using ferromagnetic materials to increase the magnetic field flux will be discussed in further detail below.

The rotor 102 is rotatably mounted within the bearing 146 so that the narrowed portion 108 thereof extends outwardly through the housing bore 138. An annular deformable thrust bearing 148 is placed between the inner end of the bearing 146 and a shoulder surface 150 defined on the rotor 102. The thrust bearing 148 serves to absorb any axial loads that may be applied to the rotor 102.

A biasing element in the form of a coil spring 152 is positioned between the armature 120 and a spring bearing surface 154 defined on the rotor 102. The spring 152 biases the armature 120 away from the magnetic coil 110. A ferromagnetic flux increasing washer 160 slidably fits over the bearing 146 and is positioned against an interior wall surface 162 of housing half 66. The flux increasing washer 160 is located between the casing 126 and the interior wall surface 162. It is contemplated, however, that the flux increasing washer 160 could also be located interiorly of the casing 126. The flux increasing washer 160 may be secured in place by "heat staking" the housing halves after assembling them together. This heat staking deforms portions of the plastic housing inwardly so as to extend over the upper face (as viewed in FIG. 2) of the washer 160 and retain the same against interior wall surface 162.

When the electric input signal is applied to the coil 110, the magnetic field is generated. The field magnetically attracts the armature 120 toward the coil 10 and into an engaged position. In this engaged position, the teeth 128 of the armature 120 are engaged with the teeth 132 of the rotor 102, thus coupling the armature 120 and the rotor 102 together. The rotation of the input gear 94 and the armature 120 will thus cause rotation of the shaft 96, rotor 102, and output pinion gear 48 in the engaged position. When the electric input signal is removed from the coil 110, the magnetic field will no longer be created or induced and the spring 152 will bias the armature 120 axially away from the coil 110 to a disengaged position wherein the teeth 128, 132 of the armature 120 and the rotor 102 are disengaged. In the disengaged position, no power from the motor 70 is transmitted to the output pinion gear 48 and the pinion gear 48 is in a 'free-wheeling' mode in which the gear 48 is allowed to rotate freely without any resistance being provided by the motor 70.

The flux increasing washer 160 is particularly advantageous in this particular application because it is a simple and low cost way of increasing the flux of the magnetic field created by the coil 110. Air and other substances such as rubber and plastic have a high reluctance (low permeability) to passing magnetic fields in comparison to ferromagnetic materials. Thus, the flux of a magnetic field flowing through a ferromagnetic material is greater than the flux of a magnetic field flowing the air. This reluctance is somewhat analogous to resistance in an electric circuit—the greater the resistance of a component, the less current will flow therethrough.

Applying these principles to the present subject matter, it can be appreciated that the flux of the magnetic field can be increased by increasing the amount of ferromagnetic material in the areas adjacent the coil 110. Thus, the casing 126, the armature 120, the rotor 102, the shaft 96, and the bearing 146, are all made of ferromagnetic material to enhance the magnetic field's flux. In order to further the increase the flux there are at least two ways to do so.

First, the coil 110 could be made larger. However, increasing the coil size is expensive because of the high cost of the insulated thin extruded copper wire which comprises the wire coiling 118. Also, the price of copper can often fluctuate and such fluctuation imposes an uncertainty into the cost of manufacturing the coil 110 and hence the entire clutch assembly 50. Second, the amount of ferromagnetic material in the magnetic field could be increased, thus decreasing the amount of air and its associated high reluctance and increasing the field's flux. One way to increase the amount of ferromagnetic material would be to increase the thickness of the casing 126. However, increasing the thickness of either or both of these components not only increases the size of the overall assembly, but also increases manufacturing costs. Specifically, it is contemplated that the coil casing 126 is to be formed by stamping and increasing the thickness of this component makes it more difficult to stamp. Also, because the casing 126 is typically stamped from sheet of uniform thickness, in order to increase the thickness of one section, the thickness of the entire component must be increased, thereby further increasing the size, weight, and cost of the assembly.

The ferromagnetic flux increasing washer 160 provides a low-cost and simple solution to this problem. The cost of providing an iron or steel flux increasing washer 160 is very low in comparison with the costs associated with increasing the thickness of other components in the assembly or increasing the size of the coil 110 and increases the flux of the magnetic field. In fact, it has been found that providing such a washer 160 approximately quadruples the field flux in comparison to an identical clutch assembly assembled without the washer 160.

The power actuator of the present application may be used in combination with a power sliding door, such as is disclosed in PCT Patent Appln. of Murray et al., No. WO 99/09282, the entirety of which is hereby incorporated into the present application by reference. Also, the power actuator of the present application may be used in combination with a power lift gate, such as is disclosed in U.S. Pat. No. 5,851,050, the entirety of which is hereby incorporated into the present application by reference.

It is to be understood that the above-described embodiment has been provided to illustrate the structural and functional principles of the present invention and is not intended to be limiting. To the contrary, the present invention is intended to cover any and all modifications and alterations.

What is claimed:

1. A power actuator comprising:
    a motor having a rotatable motor output member;
    a clutch assembly comprising:
        a rotatable clutch output member,
        a stamped, cup-shaped ferromagnetic coil casing having a generally radially extending base wall and an annular side wall extending generally axially from said base wall,
        an annular ferromagnetic flux intensifying washer positioned adjacent to the base wall of said coil casing,
        an annular coil of electroconductive material operable to selectively generate a magnetic field, said coil being disposed within said casing with said side wall extending in surrounding relation with respect to said coil such that the field generated by said coil flows generally radially through said base wall and generally axially through said side wall, a ferromagnetic armature in sliding relation with said annular coil and movable between (a) an engaged position wherein said armature couples said motor output member and said clutch output member together so that energization of said motor rotatably drives said clutch output member and (b) a disengaged position wherein the motor output member and said clutch output member are uncoupled to enable the clutch output member to rotate without resistance from said motor, whereby selective energizing of said coil effects movement of said armature between said engaged and disengaged positions thereof.

2. A power actuator according to claim 1, wherein said clutch assembly further comprises a spring engaging said armature biasing said armature towards and into the disengaged position thereof.

3. A power actuator according to claim 2, wherein said clutch assembly further comprises a rotatable rotor fixed to said clutch output member for rotation therewith and a rotatable clutch input member that rotates along with said armature which engages with said motor output member such that rotation of said motor output member rotates said clutch input member, said armature being axially movable relative to said input gear between the engaged and disengaged positions thereof, said rotor and said armature having opposing axial faces that engage one another when said armature is in said engaged position thereof to thereby couple said clutch output member and said motor output member together as aforesaid as a result of said rotor being fixed to said clutch output member, said armature rotating along with said clutch input member, and said clutch input member being engaged with said motor output member.

4. A power actuator according to claim 3, wherein said motor output member, said clutch input member, and said clutch assembly output member are each toothed gears.

5. A power actuator according to claim 4, further comprising a pair of intermediate gears engaged in an intermeshing relationship between said motor and said motor output member.

6. A power actuator according to claim 5, wherein said rotor provides a spring bearing surface and wherein said spring engages both said spring bearing surface and said armature.

7. A power latch comprising in combination:

a latch assembly having a latch member movable between (a) a released position wherein the latch member is disengaged from a striker to permit a closure panel of the vehicle to move between open and closed positions, (b) an initially latched position wherein the latch member cooperates with the striker to maintain the closure panel in a partially closed position, and (c) a fully latched position wherein the latch member cooperates with the striker to maintain the closure panel in a fully closed position, and a power actuator comprising:
  a motor having a rotatable motor output member;
  a clutch assembly comprising:
    a rotatable clutch output member operably connected to said latch member,
    a stamped, cup-shaped ferromagnetic coil casing having a generally radially extending base wall and an annular side wall extending generally axially from said base wall,
    an annular ferromagnetic flux intensifying washer positioned adjacent to the base wall of said coil casing,
    an annular coil of electroconductive material operable to selectively generate a magnetic field, said coil being disposed within said casing with said side wall extending in surrounding relation with respect to said coil such that the field generated by said coil flows generally radially through said base wall and generally axially through said side wall,
    a ferromagnetic armature in sliding relation with said annular coil and movable between (a) an engaged position wherein said armature couples said motor output member and said clutch output member together so that energization of said motor rotatably drives said clutch output member to drive said latch member to the fully latched position and (b) a disengaged position wherein the motor output member and said clutch output member are uncoupled to enable the clutch output member to rotate without resistance from said motor, whereby selective energizing of said coil effects movement of said armature between said engaged and disengaged positions thereof.

8. The combination according to claim 7, wherein said clutch assembly further comprises a spring engaging said armature biasing said armature towards and into the disengaged position thereof.

9. The combination according to claim 8, wherein said clutch assembly further comprises a rotatable rotor fixed to said clutch output member for rotation therewith and a rotatable clutch input member that rotates along with said armature which engages with said motor output member such that rotation of said motor output member rotates said clutch input member, said armature being axially movable relative to said input gear between the engaged and disengaged positions thereof, said rotor and said armature having opposing axial faces that engage one another when said armature is in said engaged position thereof to thereby couple said clutch output member and said motor output member together as aforesaid as a result of said rotor being fixed to said clutch output member, said armature rotating along with said clutch input member, and said clutch input member being engaged with said motor output member.

10. The combination according to claim 9, wherein said motor output member, said clutch input member, and said clutch assembly output member are each toothed gears.

11. The combination according to claim 10, further comprising a pair of intermediate gears engaged in an intermeshing relationship between said motor and said motor output member.

12. The combination according to claim 11, wherein said rotor provides a spring bearing surface and wherein said spring engages both said spring bearing surface and said armature.

* * * * *